United States Patent [19]

Parker et al.

[11] 4,105,256
[45] Aug. 8, 1978

[54] POWDER CONVEYING APPARATUS

[75] Inventors: Peter R. Parker, Downsview;
Norman G. Allen, Toronto, both of
Canada

[73] Assignee: Volstatic of Canada Limited,
Mississauga, Canada

[21] Appl. No.: 739,012

[22] Filed: Nov. 4, 1976

[30] Foreign Application Priority Data

Sep. 9, 1976 [CA] Canada .................................. 260843

[51] Int. Cl.² .............................................. B65G 53/14
[52] U.S. Cl. ........................................ 302/51; 302/56;
302/58
[58] Field of Search .................... 222/193; 302/58, 40,
302/56, 51

[56] References Cited

U.S. PATENT DOCUMENTS

| 424,638 | 4/1890 | Barclay et al. ..................... 302/58 X |
| 2,791,470 | 5/1957 | Jolley ..................................... 302/58 |
| 3,730,437 | 5/1973 | Rousselot ............................. 222/193 |
| 3,863,808 | 2/1975 | Vertue ............................... 302/56 X |

Primary Examiner—Robert B. Reeves
Assistant Examiner—Fred A. Silverberg
Attorney, Agent, or Firm—Fleit & Jacobson

[57] ABSTRACT

Powder conveying apparatus, particularly useful for transferring powder paint from a hopper to a spray gun, employs two flow constrictors defining axially aligned flow passages between a powder inlet and an outlet. An annular gap between opposed ends of the flow constrictors communicates with a compressed gas supply passage for entraining powder from the inlet to the outlet, and one of the flow constrictors is displaceable for adjusting the annular gap and thereby varying the powder throughput rate independently of the compressed gas supply.

9 Claims, 3 Drawing Figures

POWDER CONVEYING APPARATUS

BACKGROUND OF THE INVENTION

1. Field of the Invention

The present invention relates to powder conveying apparatus, and is useful in particular in connection with the conveyance of powder paint from a container e.g. to a spray gun for discharge into an electrostatic field or to an electrostatic spray gun.

2. Description of the Prior Art

In U.S. Pat. No. 3,863,808, issued Feb. 4, 1975 to Charles R. Vertue, there is disclosed a particulate material conveying apparatus in which a flow of compressed gas travelling along a gas flow passage is employed to draw particulate material into the gas flow passage through an inlet passage opening into one side of the gas flow passage. A vibrator is provided for vibrating the inlet passage to counteract clogging of the inlet end of the inlet passage. A gas supply pipe feeds the compressed gas to the vibrator for operating the latter and the vibrator has a compressed air outlet communicating with the gas flow passage for discharging the compressed air from the vibrator to the gas flow. Thus, only one compressed gas supply pipe is required for operating the vibrator and also for entraining the powder.

In the practice of electrostatic spray coating it is desirable and, indeed, sometimes necessary to be able to adjust the rate of throughput of powder paint through the electrostatic spray coating apparatus, e.g. to adjust the apparatus to workpieces of different sizes having different areas to be electrostatically spray coated and to adapt the apparatus to different rates of throughput of the workpieces.

Using the particulate material conveying apparatus disclosed in the aforementioned United States Patent 3,863,808, the rate of throughput of the powder paint was adjusted by varying the rate of flow of the compressed air through the gas supply pipe. However, since the powder inlet passage was relatively narrow, the rate of flow of powder through the powder inlet passage was correspondingly restricted and the variation of this rate of flow which could be achieved by adjusting the compressed gas supply through the gas supply pipe was also correspondingly restricted.

Also, for safety reasons, restrictions have been placed on the magnitudes of the voltages which can be used for electrostatically charging powder paints during spraying operations, and the premissible voltages are incapable of charging powder flowing through spray guns at high rates of flow. The abovementioned prior art particulate material conveying apparatus only allows low rates of powder to be sprayed by using low rates of flow of compressed gas for entraining the powder, which causes a risk of insufficient gas movement to avoid blockage and poor powder feeding resulting from the inability of the low gas flow to properly entrain the powder. Modification of this prior art apparatus to adapt it to low rates of powder flow causes the apparatus to be incapable of handling high rates of powder flow, which are sometimes desired.

OBJECT OF THE INVENTION

It is accordingly an object of the present invention to provide a novel and improved particulate material conveying apparatus, using compressed gas to entrain particulate material, the apparatus being adjustable to vary the rate of entrainment of the particulate material independently of the rate of supply of the compressed gas to the apparatus.

BRIEF SUMMARY OF THE INVENTION

According to the present invention, there is provided powder conveying apparatus comprising first and second means defining first and second powder passages, respectively, the first and second means being spaced apart from one another with the first and second powder flow passages in axial alignment and with the first and second means defining an annular gap between opposed ends thereof. A powder inlet communicates with the first powder flow passage and the opposite end of the first means, and a powder outlet communicates with the second powder flow passage at the opposite end of the second means. A compressed gas supply passage communicates with the annular gap for supplying compressed gas through the latter into the second powder flow passage, whereby powder is drawn in through the powder inlet and the first powder flow passage and entrained through the second powder flow passage and the powder outlet, and means are provided for effecting relative adjustable displacement of the first and second means to adjust the size of the annular gap and thereby to adjust the rate of flow of the powder through the apparatus.

With this apparatus, using a predetermined compressed gas supply pressure, the rate of flow of the powder through the apparatus can be adjusted by the relative displacement of the first and second means to provide a range of different powder flow rates. Also, the compressed gas supply pressure can be varied and, for each different value of the compressed gas supply pressure, a corresponding range of rates of powder flow can be attained by the adjustment of the annular gap.

In a preferred embodiment of the invention, the first and second means comprise first and second flow constrictors, which are arranged in mutual axial alignment and axially spaced apart. By axially displacing one of the flow constrictors, the gap can be varied.

The powder inlet is preferably provided at the underside of the apparatus and in axial alignment with the first and second flow passages and with the powder outlet, so that the powder flow through the apparatus extends along a linear path. This avoids changes in the direction of flow of the powder through the apparatus, which have been found in practice with prior art devices to cause deposition of the powder on the interior of the apparatus.

BRIEF DESCRIPTION OF THE DRAWINGS

The invention will be more readily understood from the following description of a preferred embodiment thereof given, by way of example, with reference to the accompanying drawings, in which.

DESCRIPTION OF PREFERRED EMBODIMENT

Figure 1:
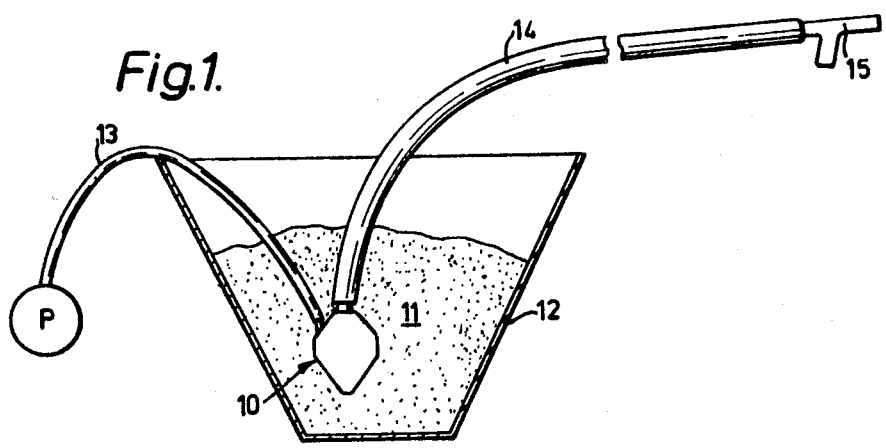
FIG. 1 shows a side view in section through a powder paint container provided with a conveying apparatus for transferring powder paint from the container to a spray gun.

Referring firstly to FIG. 1, there is shown in this Figure a powder conveying apparatus or unit, indicated generally by reference numeral 10, which is buried in an accumulation 11 of powder paint contained in a hopper 12.

An air compressor or pump $p$, which may if desired be replaced by any other suitable source of compressed air, is connected by a compressed air supply pipe 13 to the conveying apparatus 10.

The conveying apparatus 10 also has an outlet, as will be described in greater detail hereinafter, through which the powder paint is entrained in a compressed air stream, and which is connected by an outlet pipe 14 to an electrostatic spray gun 15.

The compressed air supply pipe 13 and the powder outlet pipe 14 are flexible hoses made, for example, of rubber or plastic material, so that the conveying apparatus 10 can be readily removed from the hopper 12 and transferred to a different powder paint hopper or other powder container.

Figure 2:
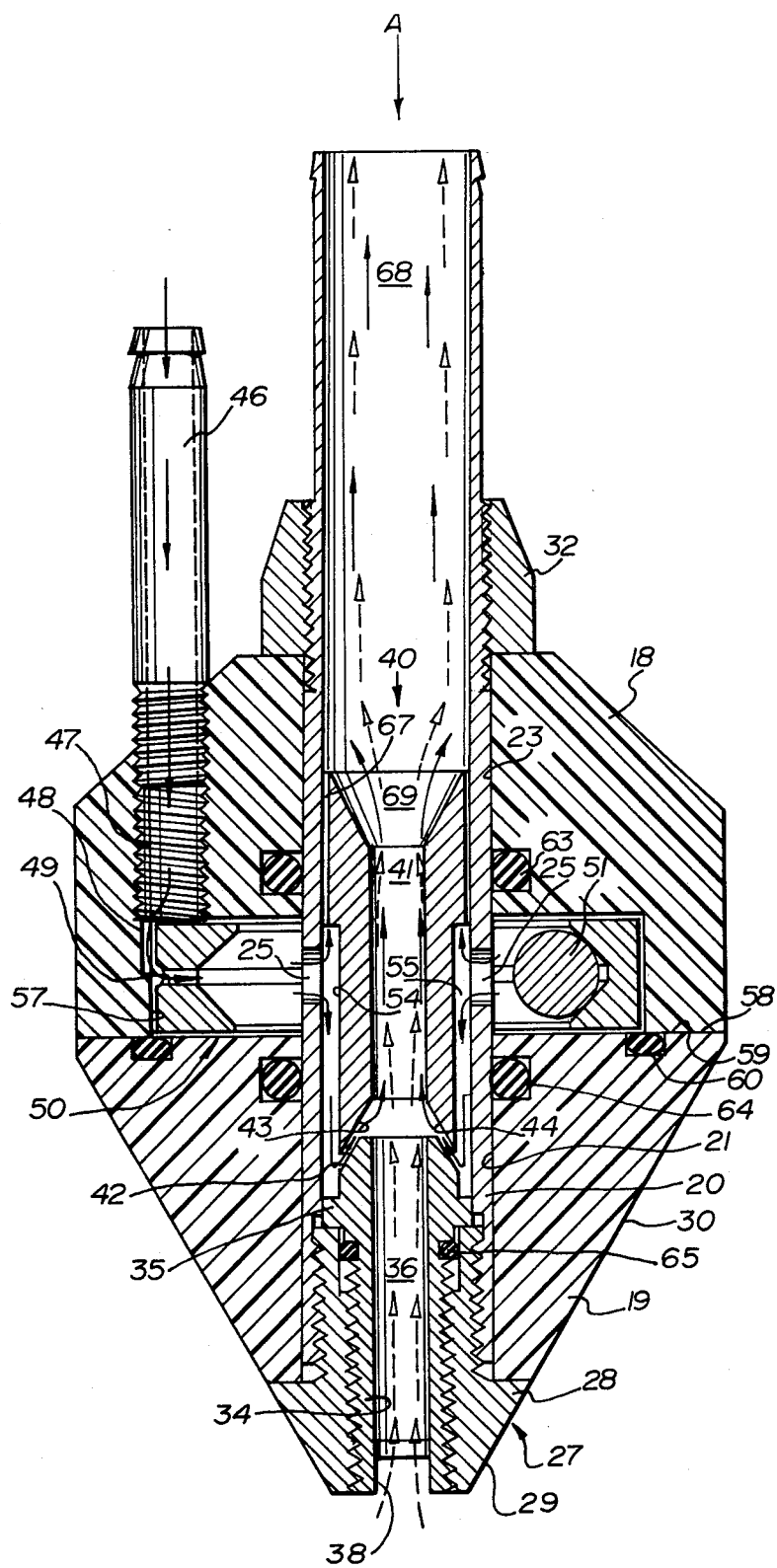
FIG. 2 shows a view taken in transverse cross-section through the conveying apparatus of FIG. 1.
Figure 3:
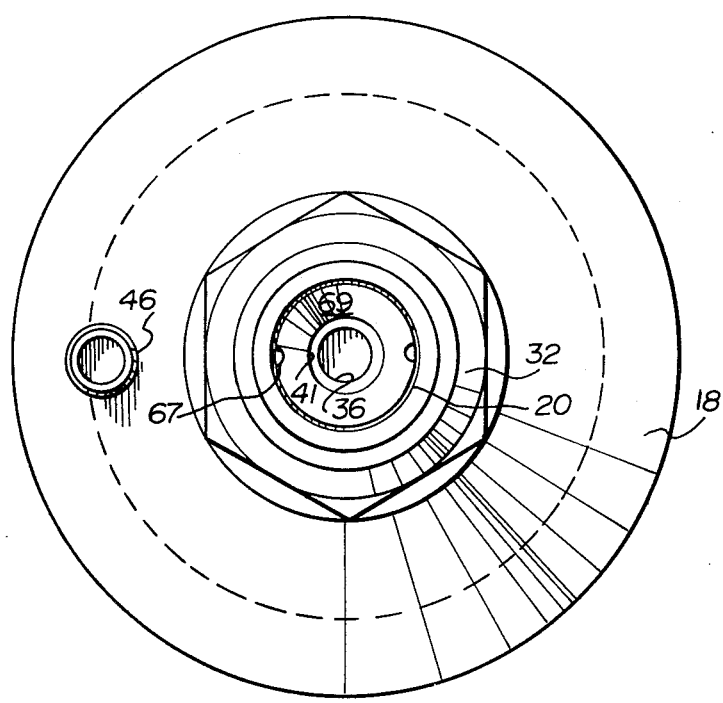
FIG. 3 shows a view of the conveying apparatus taken in the direction of the arrow A of FIG. 2.

The construction of the conveying apparatus 10 is illustrated in greater detail in FIGS. 2 and 3.

As can be seen from FIGS. 2 and 3, the conveying apparatus 10 has a body formed by an upper body part 18 and a lower body part 19, which are made of plastics material, for example, nylon.

A tubular member 20 is inserted through a vertical cylindrical opening 21 in the lower body part 19 and a vertical cylindrical opening 23 in the upper body part 18. The tubular member 20 is formed with a plurality of circular air passage openings 25.

At its lower end, the tubular member 20 is internally threaded for threaded engagement with a cup nut indicated generally by reference numeral 27, and the cup nut 27 has a head 28 formed with a downwardly-convergent frustoconical outer surface 29. The head 28 abuts the underside of the lower body part 19, which has a frusto-conical external surface 30 conforming with the frusto-conical surfaces 29 of the cup nut 27.

The tubular member 20 has an external threading for threaded engagement with an adjustment nut 32, which is seated against the upper side of the upper body part 18. Consequently, the cup nut 27 and the adjustment nut 32 secure together the upper and lower parts 18 and 19.

A first flow constrictor 34 extends through and in threaded engagement with the cup nut 27 and is formed with a collar 35 abutting the innermost end of the cup nut 27.

The flow constrictor 34 is also formed with a longitudinal boring 36 forming a first powder flow passage.

The cup nut 27 is formed at its underside with a transverse recess 38 of rectangular shape for engagement with a tool (not shown) for tightening the cup nut 27.

A second flow constrictor, indicated generally by reference numeral 40, is press fitted into the tubular member 20 and has a cylindrical axial boring 41 forming a second powder flow passage, which is in axial alignment with the boring 36, the borings 36 and 41 being co-axial with the tubular member 20.

The flow constrictors 34 and 40 have opposed ends formed with frusto-conical surfaces 42 and 43, respectively, which converge in an upward direction, as viewed in FIG. 2, this upward direction being the direction of powder flow through the flow constrictors 34 and 40, as described in greater detail hereinafter. The frusto-conical surfaces 42 and 43 are spaced apart from one another in the axial direction in order to form an annular gap 44 between the opposed ends of the flow constrictors 34 and 40.

A compressed gas supply pipe 46 is in threaded engagement with a recess 47 in the upper body part 18, and the recess 47 communicates through a boring 48 with an inlet opening 49 of a ball race, indicated generally by reference numeral 50, which forms part of a vibrator for vibrating the powder conveying apparatus and which is provided with a ball 51. The recess 47, boring 48 and opening 49 serve as a compressed gas supply passage.

The ball race 50 is co-axial with the tubular member 20 and is spaced radially outwardly therefrom by a distance sufficient to enable the ball 51 to travel freely around the tubular member 20 and the ball race 50.

The opening 49 communicates, through the ball race 50 and through the openings 25 in the tubular member 20, with the interior of the latter.

The second flow constrictor 40 has a stepped outer surface 54 which is radially inwardly spaced from the inner surfaces of the tubular member 20 to form therebetween an annular chamber 55. The annular chamber 55 extends axially downwardly from above the openings 25 to below the annular gap 44.

The ball race 50 is accommodated in a cylindrical recess 57 in the underside 58 of the upper body part 18. The upper body part underside 58, which is flat, is seated on the top 59 of the lower body part 19, the top 59 likewise being flat except for an annular recess accommodating a resilient seal ring 60 which, as can be seen from FIG. 2, underlies the bottom of the cylindrical wall of the cylindrical recess 57. The seal 60 serves to prevent escape of compressed air from the recess 57 between the upper and lower body parts 18 and 19.

A pair of O-rings 63 and 64, which are recessed in the upper and lower body parts 18 and 19, respectively, are compressed against the exterior of the tubular member 20 for sealing the latter to the upper and lower body parts 18 and 19 and thereby preventing the escape of compressed air from the cylindrical recess 57 along the exterior of the tubular member 20.

A further resilient O-ring 65 recessed in the exterior of the first flow constrictor 34 and compressed against the interior of the cup nut 27 prevents leakage of the compressed gas downwardly between the flow constrictor 34 and the cup nut 27.

The annular chamber 55 between the stepped cylindrical surface 54 of the flow constrictor 40 and the inner surface of the tubular member 20 communicates through a plurality of longitudinal recesses or passages 67 in the outer surface of the flow constrictor 40 with a space 68 defined by the interior of the tubular member 20 above the flow constrictor 40. As will be evident from the description of the operation of this apparatus given hereinafter, the space 68 serves as a powder outlet passage.

At the upper end of the boring 41, there is provided an outwardly flaring frusto-conical mouth 69 which diverges, in the direction of powder flow, to adjacent the inner surface of the tubular member 20.

The operation of the above-described apparatus is as follows:

The compressed air supply pipe 13 of FIG. 1 is connected to the compressed air supply pipe 46 of FIG. 2 by being pushed over the outer end of the latter. Similarly, the powder outlet pipe 14 of FIG. 1 is pushed over the upper end of the tubular member 20 of FIG. 2.

The apparatus is then placed in the powder paint accumulation 11, and compressed air is fed through the compressed air supply pipe 13.

This compressed air flows from the compressed air supply pipe 46 through the recess 47, the boring 48 and the opening 49 into the ball race 50, and causes the ball 51 to be driven around the ball race 50 for vibrating the apparatus shown in FIG. 2.

The same compressed air then flows from the ball race 50 through the openings 25 into the annular chamber 55 and downwardly along the latter, as indicated by arrows in FIG. 2, to the annular gap 44.

From the annular gap 44, the compressed air flows into the boring 41 and travels upwardly along the latter, as viewed in FIG. 2, into the space 68 and thence through the outlet pipe 14.

The flow of compressed air through the annular gap 44 and upwardly past the upper end of the flow constrictor 34 causes powder to be drawn or sucked upwardly through the borings 36 and 41 and through the mouth 69 into the space 68, from where the powder is entrained further in the compressed air through the powder outlet pipe 14 to the electrostatic spray gun 15.

A small amount of the compressed air supplied into the annular space 55 is bled therefrom, through the passages 67, directly into the space 68, thus by-passing the annular gap 44 and the boring 41.

The amount, or rate of flow, of the powder drawn in through the boring 36 and entrained along the powder outlet pipe 14 is determined by the rate of supply of compressed air through the compressed air supply pipe 46 and by the size of the annular gap 44, and can be adjusted by altering either or both of these.

To decrease the size of the annular gap 44, the adjustment nut 32, which as can be seen from FIG. 3 is hexagonal, is rotated relative to the tubular member 20 by means of a suitable wrench to loosen the adjustment nut 32 and the tubular member 20 is pushed downwardly. In this way, the second or upper flow constrictor 40 is axially displaced in an adjustable manner relative to the first or lower flow constrictor 34. The adjustment nut 32 and the cup nut 27 are then retightened.

To increase the size of the annular gap 44, the cup nut 27 is loosened, the tubular member is shifted upwardly and the adjustment nut 32 and the cup nut 27 are retightened.

The lowermost end of the tubular member 20 is upwardly spaced from the top of the head 28 of the cup nut 27 to enable the annular gap 44 to be completely closed.

The amount of the axial adjustment of the flow constrictor 40, and thus the size of the annular gap 44, can conveniently be indicated by suitable markings on the adjustment nut 32 and the outer surface of the tubular member 20 adjacent the adjustment nut 32.

In addition to the adjustment of the powder flow which can be obtained by the above-described adjustment of the annular gap 44, the above-described apparatus and its manner of operation include a number of further improvements and advantages over the apparatus disclosed in the aforementioned U.S. Pat. No. 3,863,808.

For example, as can be seen from FIG. 2, and as mentioned hereinabove, the borings 36 and 41 and the space 68, which forms an outlet passage or duct for the powder, are axially aligned. Consequently, the powder flow through the apparatus shown in FIG. 2 extends along a straight or linear path. The powder flow through the apparatus is therefore not subjected to a rapid change of direction which, as has been found in practice, would cause deposition of the powder on the interior of the apparatus. In contrast, the above-described prior art apparatus necessitates a 90° change in the direction of powder flow within the apparatus.

The passages 67, which serve as by-pass passages, ensure that there is always some powder flow through the powder outlet pipe 14, even when the annular gap 44 is closed. This continuous powder flow ensures that the spray gun does not become blocked, even when the annular gap 44 is completely closed by deposition of the powder resulting from an insufficient air flow. Also, the compressed air flow through the by-pass passages 67 serves to scrub powder from the wall of the space 68 and thus to prevent powder built-up thereon.

By increasing the size of the annular gap 44 to a large value, the apparatus can be adjusted to produce a low powder throughput which is suitable for the spray painting of workpieces which are moved at a correspondingly slow rate of throughput and/or which have small areas to be sprayed. However, even with such small rate of throughput of the powder, a good flow of compressed air through the annular gap 44 and the passages 67 is maintained, which is sufficient to carry powder through the powder outlet pipe 14 and the spray gun 15. In contrast thereto, the above-described prior apparatus does not allow the powder throughput rate to be reduced sufficiently without employing such a low rate of flow of compressed air as to incur risk of powder blockage in the powder output pipe and the spray gun.

The annular chamber 55 serves as a buffer chamber which reduces pulsations in the compressed air, caused by rotation of the ball 51, being transmitted into the powder flow path, and thus avoids a pulsation effect in the spraying of the powder.

The outwardly flared mouth 69 of the flow constrictor 40 prevents the formation of vortices at the outlet end of the boring 41, which might otherwise result in deposition of powder on the outlet end of the flow constrictor 40 and on the inner wall of the tubular member 20 in the space 68, with consequential risk of flow blockage.

The upper and lower body parts 18 and 19 are made of nylon, and are therefore resistant to damage, for example, by contact by ketones in the powder paint.

The remaining parts of the apparatus shown in FIG. 2, except for the seals, the ball race and the ball 51 and the flow constrictors 34 and 40, are made of magnesium or other lightweight metal to assist the vibration of the apparatus, which also prevents powder accumulation on the various surfaces of the apparatus, the ball race 50 and the ball 51 and the flow constrictors 34 and 40 being made of steel in order to counteract wear.

While the flow constrictor 34 and the cup nut 27 have been described above, and illustrated in the accompanying drawings, as being separate parts of the apparatus, which has the advantage that the cup nut 27 can be made of lightweight magnesium, it is alternatively possible to combine these two parts as an integral nut and flow constrictor, which is preferably made of steel to counteract wear at the annular gap 44.

We claim:

1. Powder conveying apparatus for conveying powder paint from a container to a device for applying the powder paint, said apparatus comprising:
first and second means defining first and second vertical powder flow passages, respectively,
in vertical axial alignment with the second powder flow passage positioned above the first powder flow passage;

said first and second means forming first and second flow constrictors, respectively, and being axially spaced apart from one another to define an annular gap between opposed ends of said flow constrictors;

a powder inlet opening communicating with the first powder flow passage at the lowermost end of said first flow constrictor, wherein said powder inlet opening is provided at the underside of said apparatus and in axial alignment with said first and second powder flow passages;

a vertical powder outlet passage communicating with the second powder flow passage at the uppermost end of said second flow constrictor, whereby said powder inlet opening, said first and second flow passages and said powder outlet passage provide a straight-through vertical flow path;

a compressed gas supply passage communicating with said annular gap for supplying compressed gas through the latter into said second powder flow passage, whereby powder is drawn in through said powder inlet opening and entrained along said flow path;

means for effecting relative adjustable displacement of said first and second flow constrictors to adjust the size of said annular gap and thereby to adjust the rate of flow of the powder through said apparatus;

a vibrator for vibrating said apparatus to improve the powder flow therethrough, said compressed gas supply passage communicating with said annular gap through said vibrator, whereby the compressed gas both operates the vibrator and entrains the powder; and means defining at least one fixedly open by-pass passage communicating with said compressed gas supply passage and said powder outlet and by-passing said annular gap and said second powder flow constrictor.

2. Powder conveying apparatus as claimed in claim 1, wherein the opposed ends of said first and second flow constrictors have frustoconical surfaces defining said annular gap, said frustoconical surfaces each being convergent in the direction of flow of the powder along said powder flow passages.

3. Powder conveying apparatus as claimed in claim 1, wherein said means defining said bypass passage comprises a longitudinal passage in the outer surface of said second flow constrictor, said longitudinal passage permitting gas flow from said gas supply passage to said powder outlet independent of the size of said annular gap.

4. Powder conveying apparatus as claimed in claim 1, wherein said means defining said by-pass passage comprises a longitudinal passage in the outer surface of said second flow constrictor, said longitudinal passage communicating with said powder outlet passage adjacent the wall of said powder outlet passage at the upper end of said second flow passage.

5. Powder conveying apparatus for conveying powder paint from a container to a spray gun, comprising:

first and second means defining first and second vertical powder flow passages, respectively;

a vertical tubular member accommodating therein said first and second means with the first and second flow passages in axial alignment with the second powder flow passage positioned above the first flow passage;

said first and second means forming first and second flow constrictors, respectively, in said tubular member, and being axially spaced apart from one another along said tubular member to define a gap between opposed ends of said flow constrictors;

a powder inlet opening communicating with the first powder flow passage at the lowermost end of said first flow constrictor;

said tubular member defining a powder outlet passage communicating with the second powder flow passage at the opposite end of said second flow constrictor;

a compressed gas supply passage communicating with said gap for supplying compressed gas through the latter into said second powder flow passage, whereby powder is drawn in through said powder inlet opening and said first powder flow passage and entrained through said second powder flow passage and said powder outlet;

said tubular member being adjustably displaceable in an axial direction relative to said first flow constrictor;

said second flow constrictor being secured to said tubular member for displacement therewith;

means for effecting the displacement of said tubular member and therewith said second flow constrictor to adjust the size of said gap and thereby to adjust the rate of flow of the powder through the apparatus;

a vibrator, said compressed gas supply passage communicating with said gap through said vibrator and through said tubular member, said second flow constrictor comprising a portion thereof spaced inwardly of said first tubular member to define an annular chamber therebetween, said compressed gas supply passage communicating with said gap through said annular chamber; and means defining at least one fixedly open by-pass passage connecting said annular chamber and said powder outlet passage and by-passing said second powder flow passage.

6. Powder conveying apparatus as claimed in claim 5, wherein said bypass passage defining means comprise longitudinal recesses in the outer surface of said second flow constrictor.

7. Powder conveying apparatus as claimed in claim 5, wherein said powder inlet opening is provided at the underside of said apparatus and in axial alignment with said powder flow passages.

8. Powder conveying apparatus as claimed in claim 5, wherein said second powder flow passage flares outwardly to adjacent the inner surface of said tubular member at said opposite end of said second flow constrictor.

9. Powder conveying apparatus as claimed in claim 5, wherein said opposed ends of said flow constrictors have annular end surfaces each converging in the direction of flow of the powder, said end surfaces defining said gap between said flow constrictors.

* * * * *